United States Patent
Ohnishi (10) Patent No.: US 6,700,925 B1
(45) Date of Patent: Mar. 2, 2004

(54) APPARATUS FOR DETECTING CORRELATION, SPECTRUM DESPREAD APPARATUS AND RECEIVER HAVING THE SAME, AND METHOD FOR DETECTING CORRELATION

(75) Inventor: Osamu Ohnishi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/514,244

(22) Filed: Feb. 28, 2000

(30) Foreign Application Priority Data

Mar. 1, 1999 (JP) .......................... 11-053322

(51) Int. Cl.$^7$ ..................... H04B 1/707; G06F 17/15
(52) U.S. Cl. ..................... 375/150; 708/422
(58) Field of Search ..................... 375/142, 143, 375/150, 152, 343, 372; 370/320, 335, 342, 441; 708/422, 314

(56) References Cited

U.S. PATENT DOCUMENTS

| 5,361,276 A | 11/1994 | Subramanian ................. 375/1 |
| 5,903,595 A | * 5/1999 | Suzuki ....................... 375/152 |
| 6,118,808 A | * 9/2000 | Tiemann et al. ............ 375/142 |
| 6,373,881 B1 | * 4/2002 | Mizuguchi et al. ......... 375/147 |

FOREIGN PATENT DOCUMENTS

| JP | 7-115387 | 5/1995 |
| JP | 08-172342 | 7/1996 |
| JP | 9-055693 | 2/1997 |
| JP | 10-173485 | 6/1998 |
| JP | 10-178334 | 6/1998 |
| JP | WO99/06922 | 2/1999 |
| JP | 2000-124836 | 4/2000 |
| JP | 2000-174661 | 6/2000 |
| JP | 2000-196498 | 7/2000 |
| JP | 2000-252869 | 9/2000 |

* cited by examiner

Primary Examiner—Betsy L. Deppe
(74) Attorney, Agent, or Firm—Foley & Lardner (57) ABSTRACT

Provided is an apparatus for detecting a correlation of samples with a spread code comprising: an L-chip accumulator which inputs the samples to generate and output an intermediate correlation signal of a bit width of W, wherein W is an integer larger than one; memories as many as M−1, each of which has a data width of 2W bits and addresses as many as L×N/2 and stores samples of the intermediate correlation signal as many as L×N while combining two samples as one pair; an adder which has input terminals as many as M and inputs from one of the input terminals the intermediate correlation signal which is outputted from the L-chip accumulator and from the other of the input terminals the intermediate correlation signal which is outputted from a corresponding memory among the memories; and a controller which supplies the intermediate correlation signal outputted from the L-chip accumulator to the memories as many as M−1 in rotation with a unit of L×N samples, and reads, and supplies to each of the other of the input terminals of the adder, the intermediate correlation signal which has been stored in each of the memories M−1 times; wherein an output of the adder is outputted as an correlation signal outputted from the apparatus.

16 Claims, 9 Drawing Sheets

APPARATUS FOR DETECTING CORRELATION, SPECTRUM DESPREAD APPARATUS AND RECEIVER HAVING THE SAME, AND METHOD FOR DETECTING CORRELATION

BACKGROUND OF THE INVENTION

1. Field of the Invention

The present invention relates to an apparatus and method for detecting a correlation which outputs a correlation signal indicative of a correlation between a transmitted signal which has been spread in spectrum and a spread code signal, and a spectrum despread apparatus and receiver having the apparatus for detecting a correlation.

2. Description of the Prior Art

CDMA (Code Division Multiple Access) system attracts attention as a multiple access system in a mobile communication system including base stations and transmission/reception terminals as portable mobile stations, because the CDMA system has a possibility to drastically increase subscriber capacity. In the CDMA system, a signal to be transmitted is spread in spectrum with a spread code signal such as a M-sequence code signal and a Gold sequence code signal before transmission from a transmitting apparatus, which is a base station or a transmission/reception terminal, and a transmission signal received by a receiving apparatus, which is the transmission/reception terminal or the base station, is despread by the same spread code signal as the transmitting apparatus to produce a decoded signal.

In order to despread a transmission signal with a spread code signal in a spectrum despread apparatus of a receiving apparatus, it is necessary to generate a spread code signal having a sequence and phase which are the same as the transmission signal. The phase of the spread code signal which has spread the transmission signal is detected by detecting a peak timing of an output of a correlation detecting apparatus.

Figure 7:
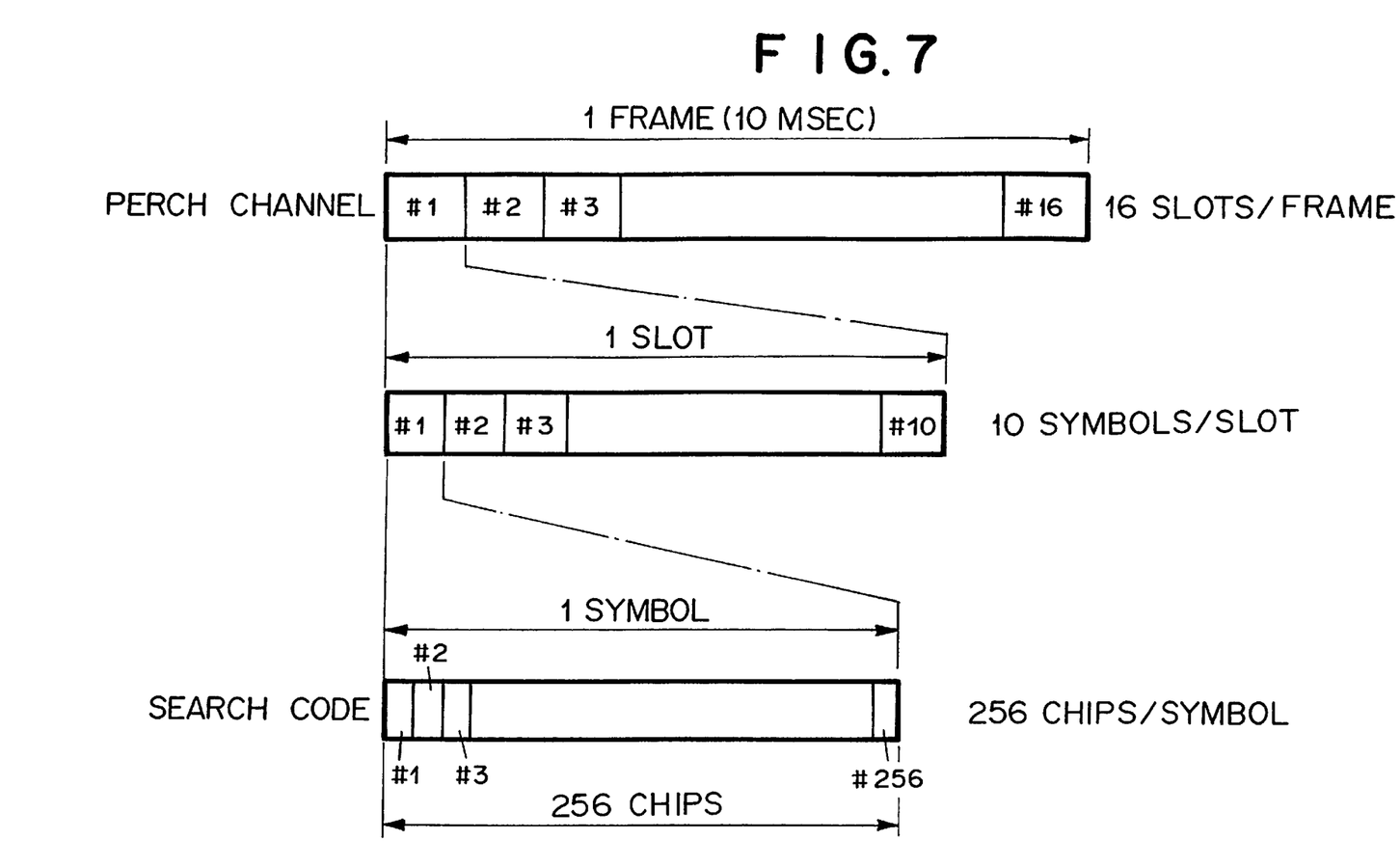
FIG. 7 is a format diagram of a Perch Channel of the W-CDMA system proposed by ARIB.
Figure 8:
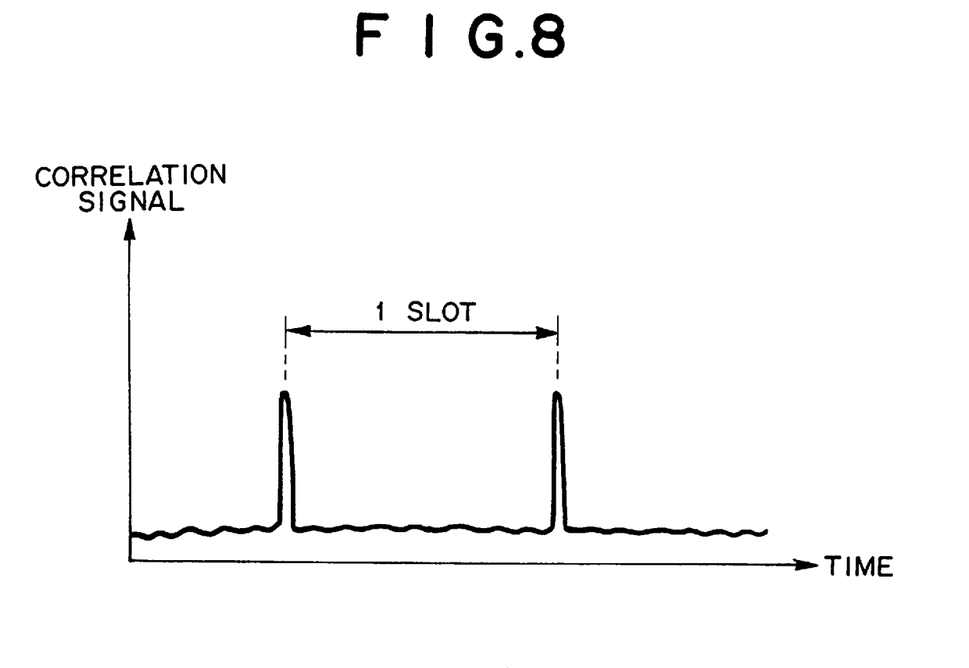
FIG. 8 is a graph showing an output of an apparatus for detecting correlation.

According to a signal format of a W-CDMA (Wideband Code Division Multiple Access) system proposed by ARIB (Association of Radio Industries and Businesses) as shown in FIG. 7, Perch Channel's one frame having a period of 10 msec is divided into 16 slots and each slot is divided into 10 symbols. A Search Code is assigned to the first symbol of each slot. The Search Code is a code common among all the transmission/reception terminals and composed of 256 chips. A correlation detecting apparatus of each transmission/reception terminal outputs a correlation signal in one slot time at a minimum by using the Search Code. The correlation detecting apparatus outputs a correlation signal as shown in FIG. 8 as a phase detection signal. In addition, the correlation detecting apparatus oversamples each chip. An oversampling frequency thereof is, for example, a double or quadruple of a chip rate.

Formerly, the Search Code consisting of 256 chips was of 256 period. ARIB, however, has proposed the Search Code of L×M period, where L×M=256. The Search Code of L×M period is a Search Code which repeats a spread signal of a period of L by M times. The values of L and M are integers larger than one. The values of L and M are, for example, 16 and 16, respectively. The Search code of L×M is inverted or not inverted in a unit of the value of M in accordance with a prescribed rule. There may be an extreme rule which does not invert the Search Code at all.

Figure 9:
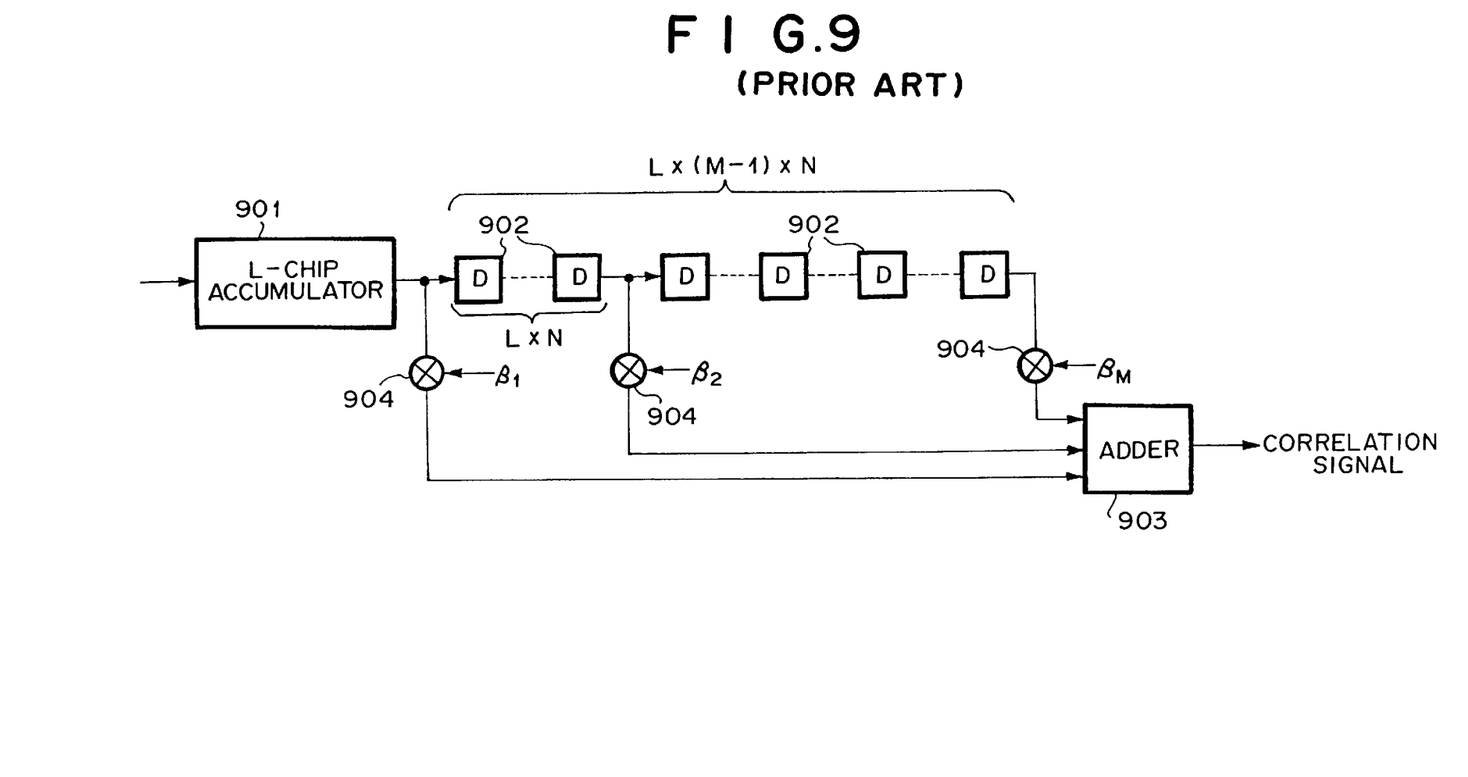
FIG. 9 is a block diagram showing the structure of a conventional apparatus for detecting correlation.

The correlation detection apparatus proposed by ARIB, AIF/SWG2-28-18, Cell Search Scheme for 1st and 2nd stage, ST8 as shown in FIG. 9 Comprises L-Chip accumulator 901, shift register 902 consisting of D-type flip-flops as many as L×(M−1)×N, adder 903 having inputs as many as M, and multiplier 904 as many as M.

L-chip accumulator 901 may be, for example, a matching filter or a correlator bank.

Figure 6:
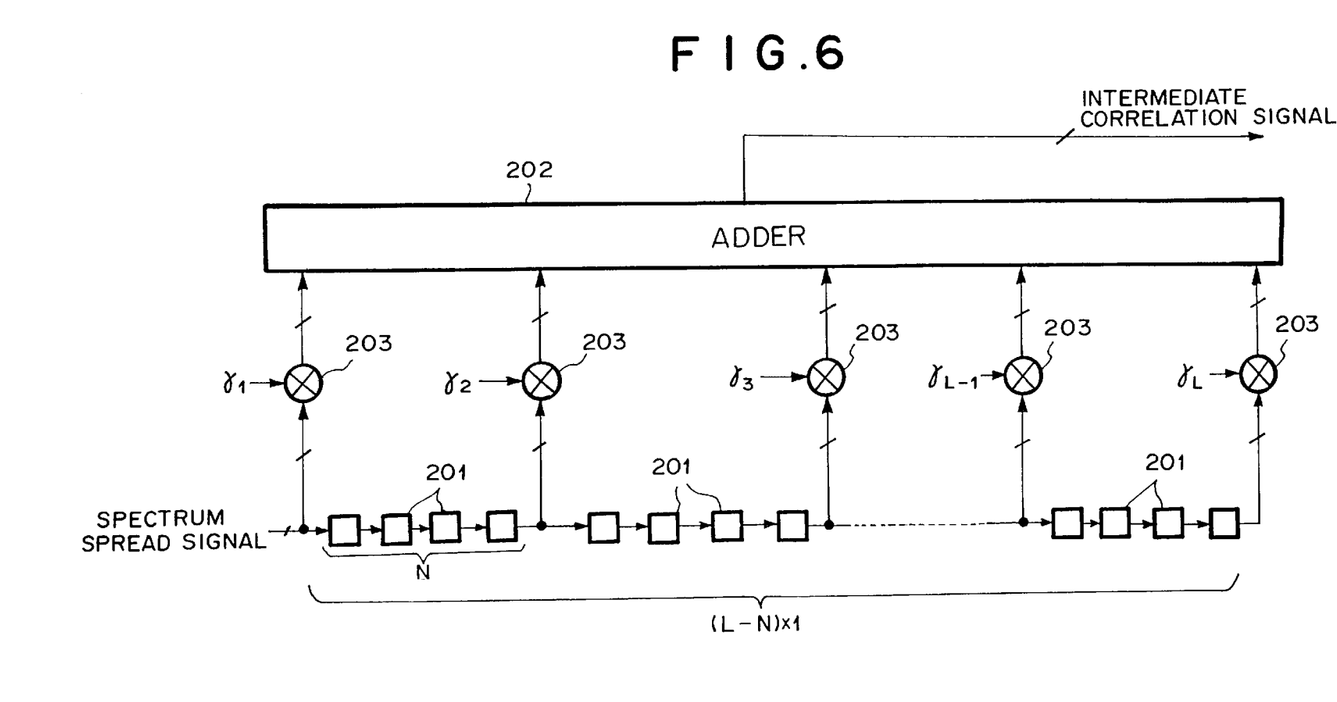
FIG. 6 is a circuit diagram showing the structure of a matching filter.

As shown in FIG. 6, a matching filter as an example of L-chip accumulator 901 comprises shift register 201 consisting of D-type flip-flops as many as (L−1)×N, multipliers 203 as many as L which multiply signals derived from every N-th taps of shift register 201 with coefficients $\gamma_i$ (i=1, 2, . . . , L), and adder 202 which sums up the outputs of multipliers 203. The matching filter takes a form of a transversal filter.

A bit width of an input of L-chip accumulator 901 is, for example, 8. A bit width of an output of L-chip accumulator 901 is 12 if the bit width of the input of L-chip accumulator 901 is 8 and the number L of inputs of adder 202 is 16.

Next, the operation of the correlation detecting apparatus will be explained with reference to FIGS. 6 and 9.

A transmission signal which has been oversampled into N samples per chip is inputted to L-chip accumulator 901. L-chip accumulator 901 adds/subtracts samples as many as L and outputs an intermediate correlation signal at each clock tick of the oversampling frequency.

The intermediate correlation signal and delayed intermediate correlation signals which are derived from every L×N-th tap of shift register 902 are inputted to multipliers 904. The coefficients $\beta_m$ (m=1, 2, . . . , M) of multipliers 904 are determined in accordance with the Search Code with L×M period. Adder 904 sums up outputs of multipliers 904 to output the sum thereof as a final correlation signal.

However, the correlation detecting apparatus as shown in FIG. 9 has disadvantages as follows:

A first disadvantage is that shift register 902 is composed of a large number of D-type flip-flops as many as L×(M−1)×N. This causes increase in circuit scale.

A second disadvantage is that input data and output data of D-type flip-flops as many as L×(M−1)×N constituting shift register 902 change at each clock tick of the oversampling frequency. This causes increase in necessitative power consumption.

The above disadvantages are serious for a portable type of a transmission/reception terminal which operates with a battery if the correlation detecting apparatus of FIG. 9 is incorporated therein.

SUMMARY OF THE INVENTION

In order to overcome the aforementioned disadvantages, the present invention has been made and accordingly, has an object to provide a correlation detecting apparatus which outputs an accurate and reliable correlation signal and is reduced in circuit scale and power consumption.

The present invention has another object to provide a spectrum despread apparatus, receiving terminal, and transmitting/receiving apparatus, each of which has the correlation detecting apparatus which outputs an accurate and reliable correlation signal and is reduced in circuit scale and power consumption.

The present invention has further object to provide a correlation detecting method which outputs an accurate and reliable correlation signal and reduces circuit scale and power consumption.

According to a first aspect of the present invention, there is provided an apparatus for detecting a correlation of samples with a spread code, the samples being obtained by sampling a spectrum spread signal in a range of one symbol period with a oversampling rate which is N-fold of a chip rate, wherein N is an integer larger than zero, the spread code being of L×M period per symbol, wherein L and M are integers larger than one, the spectrum spread signal having been spread in spectrum by the spread code signal, the apparatus comprising: an L-chip accumulator which inputs the samples to generate and output an intermediate correlation signal of a bit width of W, wherein W is an integer larger than one; memories as many as M−1, each of which has a data width of 2W bits and addresses as many as L×N/2 and stores samples of the intermediate correlation signal as many as L×N while combining two samples as one pair; an adder which has input terminals as many as M and inputs from one of the input terminals the intermediate correlation signal which is outputted from the L-chip accumulator and from the other of the input terminals the intermediate correlation signal which is outputted from a corresponding memory among the memories; and a controller which supplies the intermediate correlation signal outputted from the L-chip accumulator to the memories as many as M−1 in rotation with a unit of L×N samples, and reads, and supplies to each of the other of the input terminals of the adder, the intermediate correlation signal which has been stored in each of the memories M−1 times; wherein an output of the adder is outputted as an correlation signal outputted from the apparatus.

The apparatus may further comprise: multipliers as many as M−1, each of which is connected with each of the memories and with each of the other of the input terminals of the adder; and a coefficient generator which generates coefficients of the multipliers; wherein each of the coefficients changes cyclically in a unit of L×N-fold of a period corresponding to the oversampling rate.

The apparatus may further comprise: a multiplier connected with the L-chip accumulator and with the one of the input terminals of the adder.

The memories may be one-port type of memories.

The L-chip accumulator may be a matching filter or a correlator bank.

According to a second aspect of the present invention, there is provided an apparatus for detecting a correlation of samples with a spread code, the samples being obtained by sampling a spectrum spread signal in a range of one symbol period with a oversampling rate which is N-fold of a chip rate, wherein N is an integer larger than zero, the spread code being of L×M period per symbol, wherein L and M are integers larger than one, the spectrum spread signal having been spread in spectrum by the spread code signal, the apparatus comprising: an L-chip accumulator which inputs the samples to generate and output an intermediate correlation signal of a bit width of W, wherein W is an integer larger than one; a plurality of memories, each of which stores samples of the intermediate correlation signal as many as L×N while combining a plurality of samples as one group; an adder which has input terminals as many as M and inputs from one of the input terminals the intermediate correlation signal which is outputted from the L-chip accumulator and from the other of the input terminals the intermediate correlation signal which is outputted from a corresponding memory among the memories; and a controller which supplies the intermediate correlation signal outputted from the L-chip accumulator to the memories as many as M−1 in rotation with a unit of L×N samples, and reads, and supplies to each of the other of the input terminals of the adder, the intermediate correlation signal which has been stored in each of the memories M−1 times; wherein an output of the adder is outputted as an correlation signal outputted from the apparatus.

According to a third aspect of the present invention, there is provided a spectrum despread apparatus, a reception terminal, and a transmission/reception terminal, each of which comprising the apparatus for detecting a correlation According to a fourth aspect of the present invention, there is provided a method for detecting a correlation of samples with a spread code, the samples being obtained by sampling a spectrum spread signal in a range of one symbol period with a oversampling rate which is N-fold of a chip rate, wherein N is an integer larger than zero, the spread code being of L×M period per symbol, wherein L and M are integers larger than one, the spectrum spread signal having been spread in spectrum by the spread code signal, the method comprising steps of: generating an intermediate correlation signal of a bit width of W by using the samples, wherein W is an integer larger than zero; writing samples of the intermediate correlation signal to memories as many as M−1 having data width of 2W bits and addresses as many as L×N/2 in rotation with a unit of L×N samples while combining two samples as one pair; supplying the samples of the intermediate correlation signal to one of input terminals as many as M of an adder; reading samples as many as L×N of the intermediate correlation signal which have been stored in each of the memories M−1 times; supplying the samples read in the step of reading to the other of the input terminals of the adder; and outputting an output of the adder as a correlation signal.

The method may further comprises a step of multiplying the samples supplied to the one of the input terminals of the adder with a coefficient.

The method may further comprises a step of multiplying the samples supplied to each of the other of the input terminals of the adder with a coefficient which changes cyclically in a unit of L×N-fold of a period corresponding to the oversampling rate.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

Figure 1:
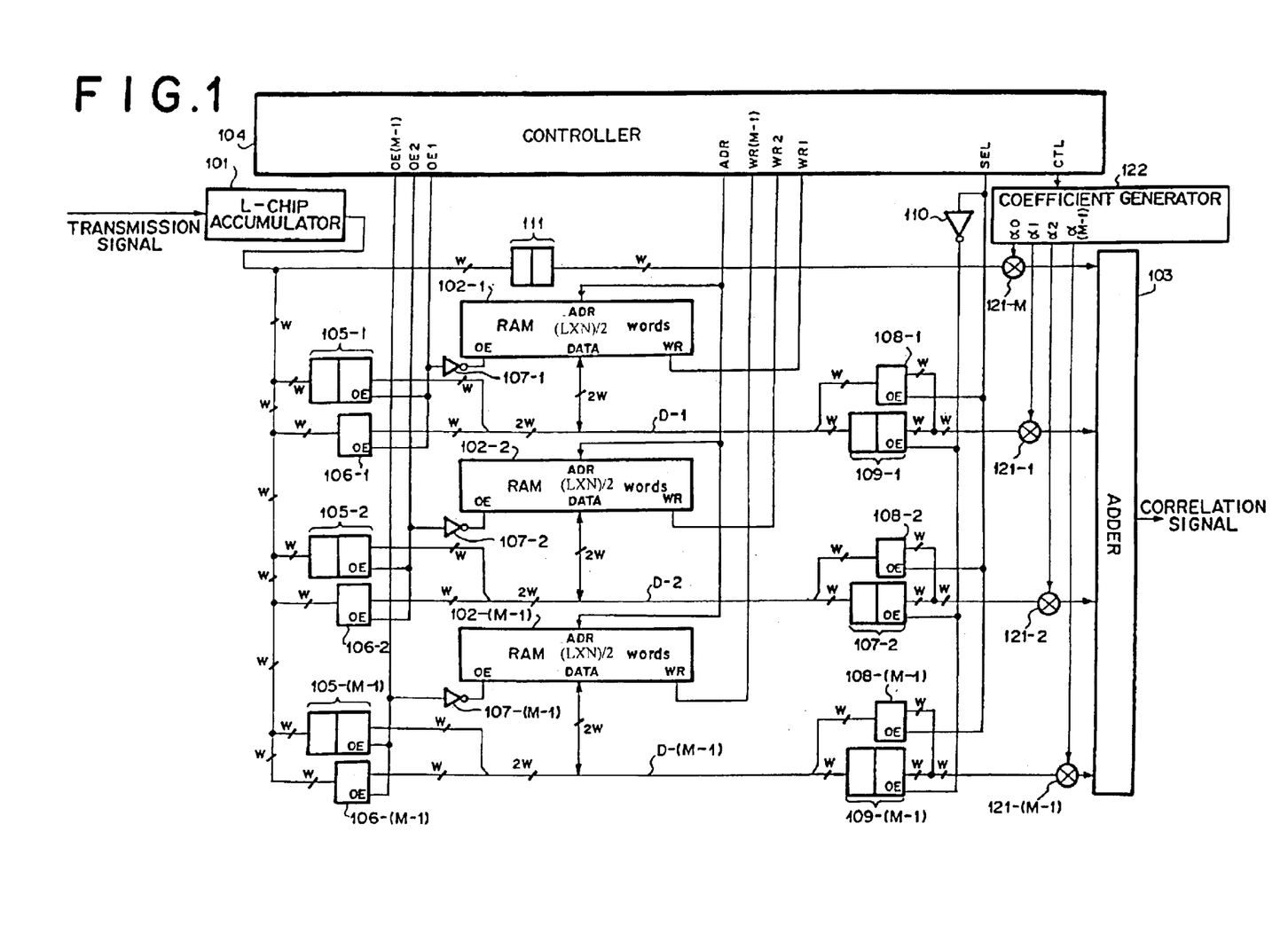
FIG. 1 is a block diagram showing the structure of an apparatus for detecting correlation according to an embodiment of the present invention.

Referring to FIG. 1, a correlation detecting apparatus according to the embodiment of the present invention comprises L-chip accumulator 101, one port type of RAMs 102-1 . . . 102-(M−1), adder 103, controller 104, two-stage D-type flip-flops 105-1 . . . 105-(M−1), one-stage D-type flip-flops 106-1 . . . 106-(M−1), inverters 107-1 . . . 107-(M−1), one-stage D-type flip-flops 108-1 . . . 108-(M−1), two-stage D-type flip flops 111, multipliers 121-1 . . . 121-M, and coefficient generator 122. A bit width of the intermediate correlation signal which is an output of L-chip accumulator 101 is W. An output of D-type flip flop 105-$m$ as an upper word and an output of D-type flip-flop 106-$m$ as a lower word are combined to be supplied to data bus D-m of a bit width of 2W which is connected to a data terminal of RAM 102-$m$. The upper word of data bus D-m is inputted to D-type flip-flop 108-$m$ and the lower word of data bus D-m is inputted to D-type flip-flop 109-$m$. An output of D-type flip-flop 108-$m$ and an output of D-type flip-flop 109-$m$ are connected together by a common line of a bit width of W, and either of them complementally appears on the common line. Therefore, the bit width of the output of L-chip accumulator 101, a bit width of inputs of multipliers 121-1 . . . 121-M, and a bit width of an input of adder 103 are W, while a bit width of the data bus of RAM 102-$m$ is 2W. In the above, m takes a value from one to M−1 and the same is said in the explanation below. The value of W is, for example, 12 if a bit width of an input of L-chip accumulator 101 is 8, and the value of L is 16.

All the members of the correlation detecting apparatus as shown in FIG. 1 operate at a frequency of N-fold of a chip rate, wherein N is an integer larger than zero and usually 4.

L-chip accumulator 101 inputs a transmission signal of a bit width of, for example, 8 which has been oversampled with a frequency of N-fold of a chip rate.

L-chip accumulator 101 is the same as that of the prior art, and such as a matching filter and a correlator bank. The structure of L-chip accumulator 101 when it is the matching filter is as shown in FIG. 6.

An output of L-chip accumulator 101 is inputted to D-type flip-flops 111, 105-1 . . . 105-(M−1), and 106-1 . . . 106-(M−1). D-type flip-flop 111 is not essential for the present invention and provided for the purpose to adjust timing of input signals inputted to adder 103. An output of D-type flip-flop 111 is inputted to multiplier 121-M. An output of multiplier 121-M is inputted to one of input terminals of adder 103.

Each of even samples of the output of L-chip accumulator 101 is outputted from D-type flip-flop 105-$m$ as an upper word, and each of odd samples of the output of L-chip accumulator 101 is outputted from D-type flip-flop 106-$m$ as a lower word simultaneously. The upper and lower words which are simultaneously outputted from D-type flip flops 105-$m$ and 106-$m$, respectively, are written to RAM 102-$m$. The upper and lower words which are read from RAM 102-$m$ are inputted to D-type flip-flops 108-$m$ and 109-$m$, respectively. Even samples of the output of L-chip accumulator 101 delayed by RAM 102-$m$ and odd samples thereof delayed by RAM 102-$m$ alternatively appear on a common output line of D-type flip-flops 108-$m$ and 109-$m$ and these are inputted to input terminals of multipliers 121-$m'$, wherein $m'$ is from one to M−1. An output of multiplier 121-$m'$ is inputted to adder 103.

Coefficient generator 122 generates coefficients $\alpha_1 \ldots \alpha_M$ which are inputted to multipliers 121-1 . . . 121-M and generally vary every L×N clocks in accordance with a pattern of the search code of L×M period.

Adder 103 outputs the sum of outputs of multipliers 121-1 . . . 121-M as a final correlation signal.

Controller 104 outputs an address ADR which is used as a common write/read address of RAMs 102-1 . . . 102-(M−1), output enable signals OE1 . . . OE(M−1) for controlling output enable terminals of D-type flip-flops 105-1 . . . 105-(M−1), output enable terminals of D-type flip flops 106-1 . . . 106-(M−1) and output enable terminals of RAMs 102-1 . . . 102-(M−1), respectively, write control signals WR1 . . . WR(M−1) for RAM 104-1 . . . 104-(M−1), a selection signal SEL for selecting either of outputs of D-type flip-flops 108-1 . . . 108-(M−1) and outputs of D-type flip-flops 109-1 . . . 109-(M−1), and a control signal CTL for controlling coefficient generator 122.

Next, the output signals from controller 104 will be explained with reference to FIG. 2. It is assumed that signals become active when they are HIGH.

Figure 2:
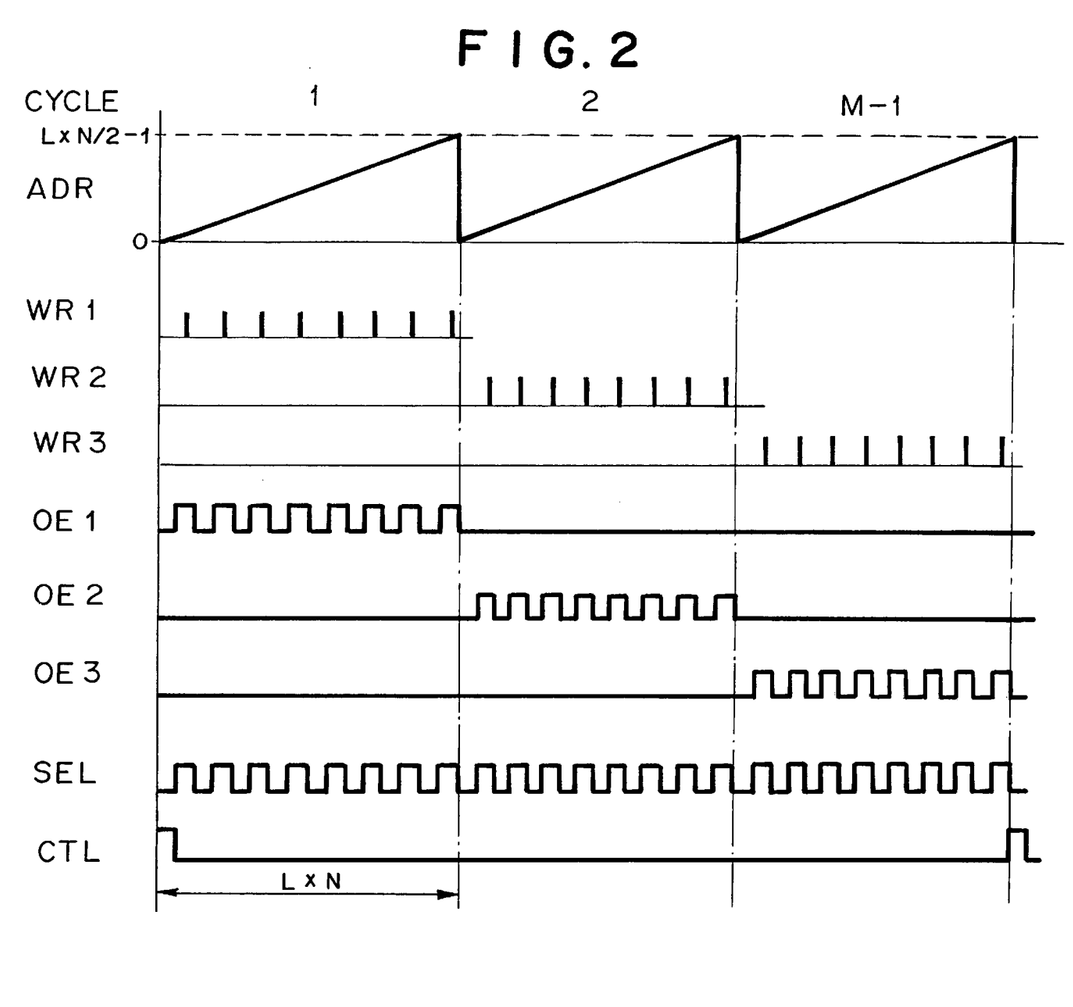
FIG. 2 is a timing chart showing signals which are outputted from controller 104 as shown in FIG. 1.

FIG. 2 shows a first cycle through a (M−1)-th cycle, wherein a cycle of L×N clocks is assumed as one cycle. Controller 104 repeatedly outputs the signals as shown in FIG. 2

Address ADR become zero at the beginning of each cycle and is incremented in the range from one to L×N/2−1 with a step of one. Write pulses of write control signal WR1 are generated every other clock in the first cycle and write control signal WR1 is kept inactive in the other cycles. Write control signals WR1 . . . WR(M−1) similarly become active or inactive with a shift of one cycle from one to another. Output enable signal OE1 becomes active every other clock in the first cycle and is kept inactive in the other cycles. Output enable signals OE1 . . . OE(M−1) similarly become active or inactive with a shift of one cycle from one to another. Control signal CTL becomes active at a first clock in the first cycle and is kept inactive the other times.

Figure 3:
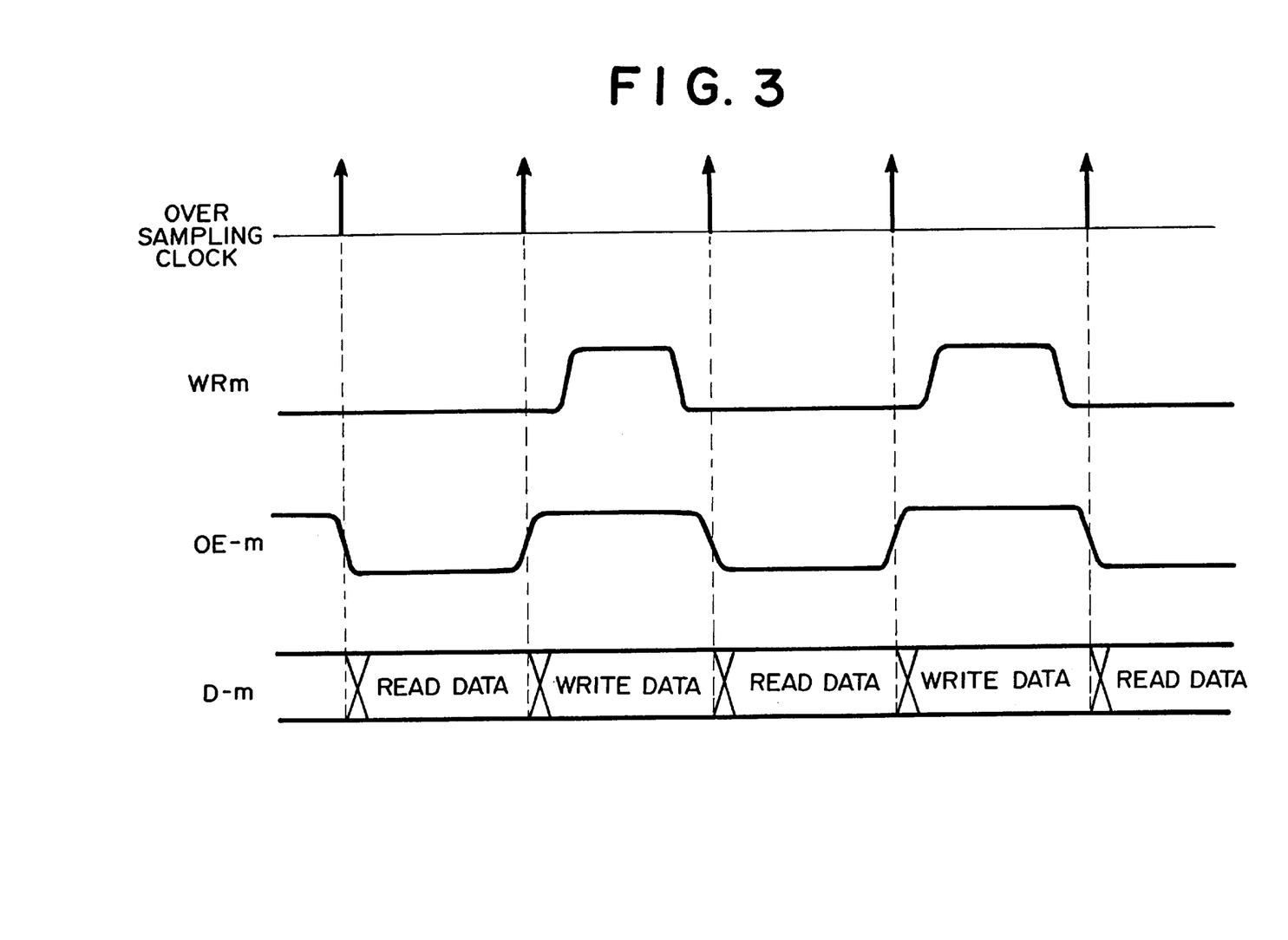
FIG. 3 is a timing chart showing control signals and data when data are inputted to and outputted from RAM 102-m.

FIG. 3 shows signals outputted from controller 104 and data which appear on data bus of RAM 102-$m$ in a cycle in which data are written and read. Such a cycle is, for example, the first cycle for RAM 102-1.

Referring to FIG. 3, when output enable OE-m becomes active, that is, when output enable OE-m becomes active for D-type flip-flops 105-$m$ and 106-$m$ and therefore data to be written appear on data bus D-m., a write pulse of write control signal WR-m is generated.

In accordance with the structure and operation explained above, for example, in the first cycle, samples as many as L×M of the first cycle outputted from L-chip accumulator 101 are inputted to adder 103 through D-type flip-flop 111 and multiplier 121-M, and written to RAM 102-1. On the other hand, samples as many as L×N read from each of RAMs 102-1 . . . 102-(M−1) are inputted to adder 103 through D-type flip-flop 108-$m'$ or 109-$m'$ and multiplier 121-$m'$. The samples as many as L×N which have written to RAM 102-$m'$ are read (M−1) times.

Coefficient generator 122 sets the value of coefficient $\alpha_1$ to −1 for the predetermined repetition number(s) of samples inputted from L-chip accumulator 101 in the first cycle and to +1 for the rest repetition number(s) of the samples. The predetermined repetition number(s) are determined by the pattern of the Search Code of L×M period. Similarly, coefficient generator 122 sets the value of coefficient $\alpha_2$ to −1 for the predetermined repetition number(s) of samples inputted from L-chip accumulator 101 in the second cycle and to +1 for the rest repetition number(s) of the samples, coefficient generator 122 sets the value of coefficient $\alpha_3$ to −1 for the predetermined repetition number(s) of samples inputted from L-chip accumulator 101 in the third cycle and to +1 for the rest repetition number(s) of the samples, and coefficient generator 122 sets the value of coefficient $\alpha_{M-1}$ to −1 for the predetermined repetition number(s) of samples inputted from L-chip accumulator 101 in the (M−1)-th cycle and to +1 for the rest repetition number(s) of the samples. Therefore, the times when coefficients $\alpha_1, \alpha_2, \alpha_3, \ldots, \alpha_{M-1}$ become −1 shift by one cycle from one to another. The value of $\alpha_M$ depends on the pattern of the Search Code of L×M period but never changes with a lapse of time.

In other words, the value of $\alpha_1, \alpha_2, \ldots, \alpha_{m-1}, \alpha_M$ are represented by the following equations:

$\alpha_1 = \beta_M, \alpha_2 = \beta_{M-1}, \ldots, \alpha_{M-1} = \beta_2, \alpha_M = \beta_1$ for the first cycle, $\alpha_1 = \beta_2, \alpha_2 = \beta_M, \ldots, \alpha_{M-1} = \beta_3, \alpha_M = \beta_1$ for the second cycle, and $\alpha_1 = \beta_3, \alpha_2 = \beta_2, \ldots, \alpha_{M-1} = \beta_M, \alpha_M = \beta_1$ for the third cycle wherein $\beta_1, \beta_2, \beta_3, \beta_M$ are the coefficients of multipliers 904 as shown in FIG. 9.

For some of the Search Code of L×M period, the value of coefficient $\alpha_M$ is 1, and multiplier 121-M may be omitted. For further some of the Search Code of L×M period, the value of only coefficient $\alpha_M$ is −1, and multipliers 121-1 . . . 121-(M−1) may be omitted.

Figure 4:
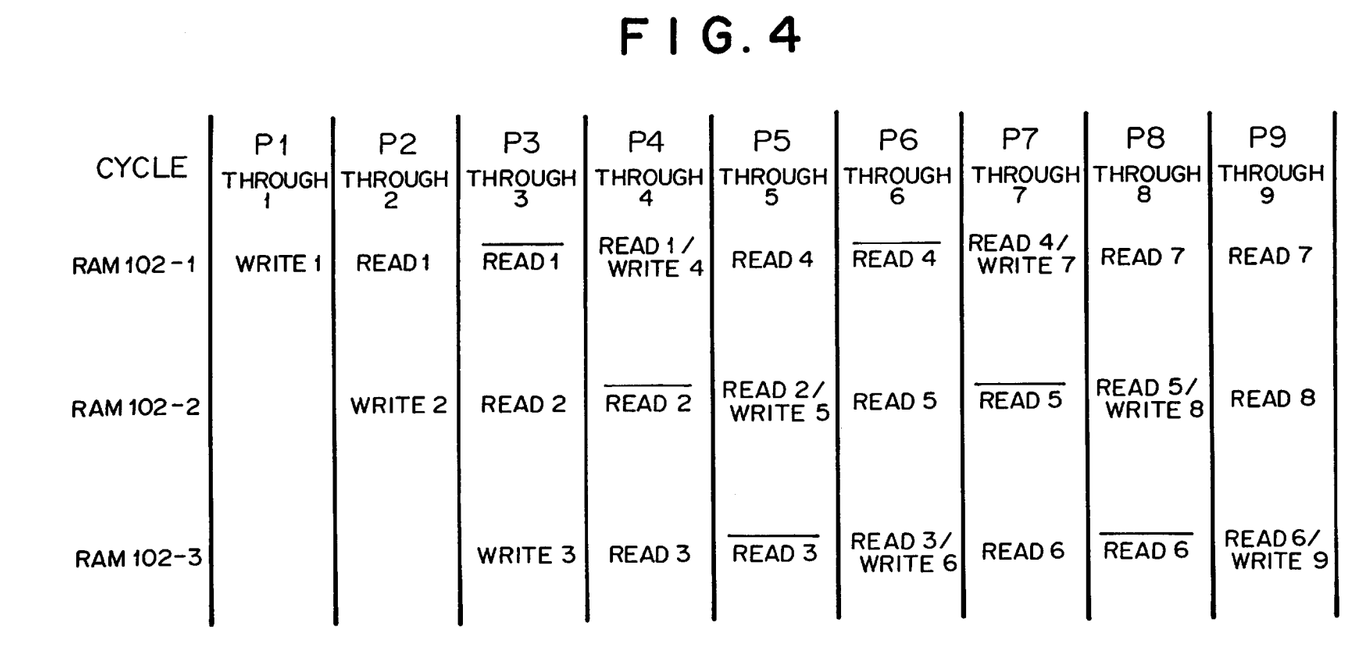
FIG. 4 is a timing chart showing signals inputted to adder 103 as shown in FIG. 1.

FIG. 4 shows a timing chart which indicates the cycle number in which samples inputted to input terminals of adder 103 belong. In FIG. 4, it is assumed that the value of M is 4 and the predetermined repetition number(s) mentioned above is only the number of three. Samples of the predetermined repetition number are represented by characters including a numeral representing a sample group number with an upper line and samples of the repetition numbers other than the predetermined repetition number are represented by characters including a numeral representing a sample group number without an upper line.

FIG. 4 shows a timing chart from period P1 to period P9. "Through 1" to "through 9" represent samples which are inputted to the first input terminal of adder 103 through D-type flip-flop 111 and multiplier 121-M instead of a RAM. Regular operation starts from cycle P4. Samples of period P4 represented by "through 4", samples of period P1 read from RAM 102-1, samples of period P2 read from RAM 102-2, and samples of period P3 read from RAM 102-3 are inputted to input terminals of adder 103 in cycle P4. Therefore, samples of periods P1 to P4 are inputted to input terminals of adder 103 in cycle P4. Similarly, samples of period P5 represented by "through 5", samples of period P4 read from RAM 102-1, samples of period P2 read from RAM 102-2, and samples of period P3 read from RAM 102-3 are inputted to input terminals of adder 103 in cycle P5. Therefore, samples of periods P2 to P5 are inputted to input terminals of adder 103 in cycle P5. In general, samples of period i, i+1, i+2 and i+3 are inputted to input terminals of adder 103 in cycle P(i+3). Therefore, it is apparent that samples which are the same as samples inputted to adder 903 from shift register 902 are inputted to adder 103.

When focusing on one sample, the sample is inverted when the sample is inputted to adder 103 with a delay of (3−1)×L×N clocks. Therefore, it is possible to invert a sample when the sample is inputted to adder 103 with a delay of m×L×N clocks by varying the value of a in accordance with the Search Code, wherein m is an integer and $1 \leq m \leq M$.

The correlation detecting apparatus of this embodiment may be realized by, for example, a gate array, a cell-based IC, and PLD (Programmable Logic Device).

Figure 5:
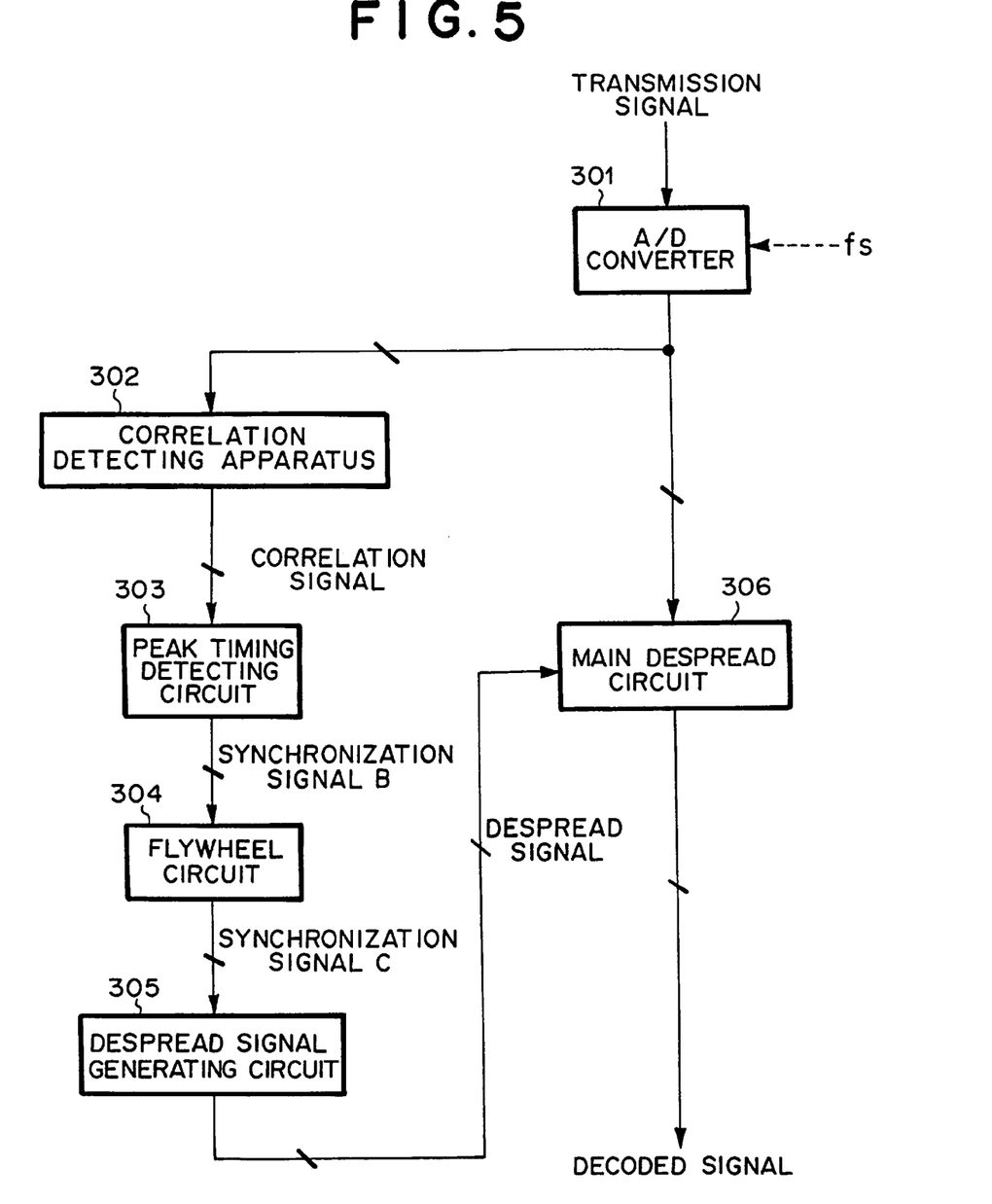
FIG. 5 is a block diagram showing the structure of a spectrum despread apparatus having the apparatus for detecting correlation as shown in FIG. 1.

FIG. 5 is a block diagram showing a structure of a spectrum despread apparatus having the correlation detecting apparatus of this embodiment. Here, the spectrum despread apparatus as shown in FIG. 5 is an example for explanation and a spectrum despread apparatus of the present invention is not limited to the apparatus as shown in FIG. 5.

Referring to FIG. 5, the spectrum despread apparatus of this embodiment comprises analog-to-digital converter 301 which digitizes an inputted transmission signal to sample signals of 8 bits with a sampling frequency which is N-fold of a chip rate, correlation detecting apparatus 302 as shown in FIG. 1 which generates a correlation signal from the sample signals, peak timing detecting circuit 303 which detects the peak timing of the correlation signal and outputs a peak timing detection signal as a synchronization signal B, flywheel circuit 304 which outputs a stable synchronization signal C on the basis of the synchronization signal B, despread signal generating circuit 305 which generates a despread signal by using the synchronization signal C as a phase reference, and main despread circuit 306 which despread the sample signals with the despread signal to output a decoded signal.

In the above embodiment, two samples are paired and stored in RAMs. However, samples more than two may be grouped and store in RAMs.

Further, in the above embodiment, single port type RAMs are used. However, dual port type RAMs may be used instead of single port type RAMs. In this case, it is unnecessary to extend the bit width of RAMs to 2W[bit]. The width can be kept to W[bit]. In this case, it is necessary to divide data bus D-m into a data bus connected to a port for writing and a data bus connected to a port for reading.

As explained above, according to the present invention, reduction in circuit scale and in power consumption is realized, because it is avoided to use flip-flops and 2-port RAMs which necessitate large area and high power consumption for a portion other than the L-chip accumulator. For example, the number of cells are reduced to 63% and the power consumption is reduced to 26% as compared with the prior art when the number L of chips per bit period is 64, the number M of bit periods is 4, the oversampling ratio N is 4, and CMOS-9HD library which is a gate array of NEC is used. Therefore, a transmission/reception terminal which incorporates the correlation detection apparatus can be miniaturized and operate for a long time even if it operates with a battery.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for detecting a correlation of samples with a spread code, said samples being obtained by sampling a spectrum spread signal in a range of one symbol period with a oversampling rate which is N-fold of a chip rate, wherein N is an integer larger than zero, said spread code being of L×M period per symbol, wherein L and M are integers larger than one, said spectrum spread signal having been spread in spectrum by said spread code signal, said apparatus comprising:

an L-chip accumulator which inputs said samples to generate and output an intermediate correlation signal of a bit width of W, wherein W is an integer larger than one, M-1 memories, each of which has a data width of 2W bits and (L×N)/2 addresses and stores L×N samples of said intermediate correlation signal while combining two intermediate correlation signals as one pair;

an adder which has M input terminals and inputs through one of said M input terminals thereof, said intermediate correlation signal which is outputted from said L-chip accumulator and inputs through the others of said M input terminals thereof said intermediate correlation signal which is outputted from a corresponding memory among said M-1 memories; and a controller which supplies said intermediate correlation signal outputted from said L-chip accumulator to said M-1memories in rotation with a unit of L×N samples, and cyclically reads each of the M-1 memories to read and supply to each of the others of said M input terminals of said adder, said intermediate correlation signal which has been stored in each of said M-1 memories;

wherein an output of said adder is outputted as an correlation signal outputted from the apparatus.

2. The apparatus according to claim 1, further comprising:

M-1 multipliers, each of which is inserted between one of said M-1 memories and one of the others of said M input terminals of said adder whereby said controller repeatedly reads and supplies to each of M-1 multipliers, said intermediate correlation signal which has been stored in each of said M-1 memories; and a coefficient generator which generates coefficients of said M-1 multipliers;

wherein each of said coefficients changes cyclically in a unit of L×N-fold of a period corresponding to said oversampling rate.

3. The apparatus according to claim 1, further comprising:

a multiplier connected with said L-chip accumulator and with said one of said M input terminals of said adder.

4. The apparatus according to claim 1, wherein said M-1 memories are one-port type of memories.

5. The apparatus according to claim 1, wherein said L-chip accumulator is a matching filter.

6. The apparatus according to claim 1, wherein said L-chip accumulator is a correlator bank.

7. A spectrum despread apparatus comprising the apparatus according to claim 1.

8. A reception terminal comprising the apparatus according to claim 1.

9. A transmission/reception terminal comprising the apparatus according to claim 1.

10. An apparatus for detecting a correlation of samples with a spread code, said samples being obtained by sampling a spectrum spread signal in a range of one symbol period with a oversampling rate which is N-fold of a chip rate, wherein N is an integer larger than zero, said spread code being of L×M period per symbol, wherein L and M are integers larger than one, said spectrum spread signal having been spread in spectrum by said spread code signal, said apparatus comprising:

an L-chip accumulator which inputs said samples to generate and output an intermediate correlation signal of a bit width of W, wherein W is an integer larger than one;

a plurality of memories, each of which stores L×N samples of said intermediate correlation signal while combining a plurality of intermediate correlation signals as one group;

an adder which has M input terminals and inputs to one of said M input terminals said intermediate correlation signal which is outputted from said L-chip accumulator and inputs through the others of said M input terminals thereof, said intermediate correlation signal which is outputted from a corresponding memory among said plurality of memories; and a controller which supplies said intermediate correlation signal outputted from said L-chip accumulator to said plurality of memories in rotation with a unit of L×N samples, and cyclically reads each of said plurality of memories to supply to each of the others of said M input terminals of said adder, said intermediate correlation signal which has been stored in each of said memories;

wherein an output of said adder is outputted as an correlation signal outputted from the apparatus.

11. A spectrum despread apparatus comprising the apparatus according to claim 10.

12. A reception terminal comprising the apparatus according to claim 10.

13. A transmission/reception terminal comprising the apparatus according to claim 10.

14. A method for detecting a correlation of samples with a spread code, said samples being obtained by sampling a spectrum spread signal in a range of one symbol period with a oversampling rate which is N-fold of a chip rate, wherein N is an integer larger than zero, said spread code being of L×M period per symbol, wherein L and M are integers larger than one, said spectrum spread signal having been spread in spectrum by said spread code signal, said method comprising steps of:

generating an intermediate correlation signal of a bit width of W by using said samples, wherein W is an integer larger than zero;

writing samples of said intermediate correlation signal to M-1 memories having data width of 2W bits and (L×N)/2 addresses in rotation with a unit of L×N samples while combining two intermediate correlation signals as one pair, supplying the samples of said intermediate correlation signal to one of M input terminals of an adder, "cyclically reading each of said M-1 memories to supply to the others of said M input terminals of said adder, L×N samples of said intermediate correlation signal which have been stored in each of said M-1 memories"; and outputting an output of said adder as a correlation signal.

15. The method according to claim 14, further comprising a step of multiplying the samples to be supplied to said one of said M input terminals of said adder with a coefficient.

16. The method according to claim 14, further comprising a step of multiplying the samples to be supplied to each of said the others of said M input terminals of said adder with a coefficient which changes cyclically in a unit of L×N-fold of a period corresponding to said oversampling rate.

* * * * *